US009823832B2

United States Patent
Shikolay

(10) Patent No.: US 9,823,832 B2
(45) Date of Patent: Nov. 21, 2017

(54) DISPLAY METHOD AND APPARATUS FOR DIVERSELY DISPLAYING AN OBJECT ACCORDING TO SCROLL SPEED

(71) Applicant: SAMSUNG ELECTRONICS CO., LTD., Suwon-si (KR)

(72) Inventor: Anatoly Shikolay, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 14/228,705

(22) Filed: Mar. 28, 2014

(65) Prior Publication Data

US 2014/0292760 A1 Oct. 2, 2014

(30) Foreign Application Priority Data

Mar. 28, 2013 (KR) ........................ 10-2013-0033785

(51) Int. Cl.
*G06T 17/00* (2006.01)
*G06F 3/0485* (2013.01)
*G06T 3/20* (2006.01)
*G06T 3/40* (2006.01)
*G06F 3/0488* (2013.01)

(52) U.S. Cl.
CPC .......... *G06F 3/0485* (2013.01); *G06F 3/0488* (2013.01); *G06T 3/20* (2013.01); *G06T 3/40* (2013.01); *G06F 2203/04806* (2013.01)

(58) Field of Classification Search
CPC ........ G06F 3/0485; G06F 3/0488; G06T 3/20
See application file for complete search history.

(56) References Cited

U.S. PATENT DOCUMENTS

| | | | |
|---|---|---|---|
| 6,671,400 B1 | 12/2003 | Ekpar et al. | |
| 6,747,680 B1 * | 6/2004 | Igarashi ................ | G06F 3/0485 345/159 |
| 6,826,729 B1 | 11/2004 | Giesen et al. | |
| 7,761,812 B2 | 7/2010 | Ostojic et al. | |
| 8,146,016 B2 | 3/2012 | Himberger et al. | |
| 8,429,555 B2 | 4/2013 | Cho et al. | |
| 2001/0017592 A1 * | 8/2001 | Armstrong ........... | H01H 13/785 341/34 |

(Continued)

FOREIGN PATENT DOCUMENTS

KR 10-2006-0007852 A 1/2006
KR 10-2008-0082354 A 9/2008

(Continued)

OTHER PUBLICATIONS

International Search Report dated Jun. 17, 2014 issued by International Searching Authority in International Application No. PCT/KR2014/002046 (PCT/ISA/210).

(Continued)

*Primary Examiner* — Charles Tseng
(74) *Attorney, Agent, or Firm* — Sughrue Mion, PLLC

(57) ABSTRACT

A display method of a display apparatus is provided. The method includes displaying at least one object in a screen, receiving a user input for receiving a scroll direction for the at least one object, and changing a size of the area of the screen in which the at least one object is displayed on the screen according to scroll speed which corresponds to the received user input, and scrolling the at least one object according to the scroll direction.

29 Claims, 8 Drawing Sheets

(56) References Cited

U.S. PATENT DOCUMENTS

| | | |
|---|---|---|
| 2005/0206658 A1 | 9/2005 | Fagans |
| 2005/0257166 A1 | 11/2005 | Tu |
| 2006/0120624 A1* | 6/2006 | Jojic ................. G06F 17/30843 382/284 |
| 2006/0156254 A1* | 7/2006 | Satake ..................... G09G 5/00 715/838 |
| 2007/0058047 A1* | 3/2007 | Henty ................... G06F 3/0304 348/211.99 |
| 2007/0209018 A1* | 9/2007 | Lindemann ......... G06F 3/04855 715/784 |
| 2008/0222558 A1 | 9/2008 | Cho et al. |
| 2008/0243375 A1* | 10/2008 | Han ..................... G01C 21/367 701/455 |
| 2009/0219304 A1* | 9/2009 | Martin .................. G06F 3/0485 345/684 |
| 2010/0058228 A1 | 3/2010 | Park |
| 2010/0156813 A1 | 6/2010 | Duarte et al. |
| 2011/0119578 A1 | 5/2011 | Schwartz |
| 2011/0126148 A1 | 5/2011 | Krishnaraj et al. |
| 2011/0126155 A1 | 5/2011 | Krishnaraj et al. |
| 2011/0126156 A1 | 5/2011 | Krishnaraj et al. |
| 2011/0154196 A1* | 6/2011 | Icho ..................... G06F 3/0485 715/702 |
| 2011/0214087 A1 | 9/2011 | Nagiyama et al. |
| 2012/0313977 A1 | 12/2012 | Kwon |

FOREIGN PATENT DOCUMENTS

| | | |
|---|---|---|
| KR | 10-2010-0027688 A | 3/2010 |
| KR | 10-2010-0054017 A | 5/2010 |
| KR | 10-2012-0113738 A | 10/2012 |

OTHER PUBLICATIONS

Written Opinion dated Jun. 17, 2014 issued by International Searching Authority in International Application No. PCT/KR2014/002046 (PCT/ISA/237).

Communication dated Dec. 4, 2014, issued by the European Patent Office in counterpart European Application No. 14162065.8.

Communication dated May 10, 2016, issued by the European Patent Office in counterpart European Application No. 14162065.8.

Communication dated Jan. 31, 2017 issued by the Mexican Institute of Industrial Property in counterpart Mexican Patent Application No. MX/a/2015/013647.

Communication dated Feb. 9, 2017 issued by the European Patent Office in counterpart European Patent Application No. 14162065.8.

Communication issued by the Mexican Patent Office on Aug. 1, 2017 in counterpart Mexican Patent Application No. MX/a/2015/013647.

Communication issued by the European Patent Office on Aug. 11, 2017 in counterpart European Patent Application No. 14162065.8.

* cited by examiner

DISPLAY METHOD AND APPARATUS FOR DIVERSELY DISPLAYING AN OBJECT ACCORDING TO SCROLL SPEED

CROSS-REFERENCE TO RELATED APPLICATION

This application claims priority from Korean Patent Application No. 10-2013-0033785, filed on Mar. 28, 2013, in the Korean Intellectual Property Office, the disclosure of which is incorporated herein by reference, in its entirety.

BACKGROUND

1. Field

Apparatuses and methods consistent with exemplary embodiments relate to an object display method. More particularly, the exemplary embodiments relate to a display method of a display apparatus and a display apparatus, which diversely displays an object according to scroll speed.

2. Description of the Related Art

With the development of display apparatuses, various display methods have been developed. The display methods provide various user experiences in order to increase intuitive recognizability by a user with respect to information displayed in a screen.

Existing user experiences may be implemented in devices. For example, electronic books may be implemented to represent color similar to real paper books, and may display an operation of turning a page similar to an operation of turning a page in real paper books.

To the contrary, the devices may provide new user experiences similar to existing user experiences. For example, in general, pinch in/pinch out commands which display a desired portion through zoom-in/zoom-out in a touch screen apparatus have been widely used. The user may expand the desired portion through a touch operation which spreads fingers and display the desired portion. The display method is technology which provided a new user with experiences that did not previously exist.

In recent years, the latter has become more emphasized than the former in electronic apparatuses, and electronic apparatuses have been developed to function as more convenient appliances by providing new user experiences through the electronic apparatuses.

In particular, due to strong functions of the devices, since an amount of data displayed in the devices is increased, there exists a need for technology for efficiently searching data within the devices. Thumbnail image or icon display technology exists, but there is still a need for a more efficient method of intuitively displaying a large amount of objects, as necessary.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method capable of more efficiently displaying, intuitively, a large amount of objects, as necessary.

According to an aspect of an exemplary embodiment, there is provided a display method of a display apparatus. The display method may include displaying at least one object in a screen; receiving a user input for receiving a scroll direction for the at least one object; and changing a size of the area of the screen in which the at least one object is displayed on the screen, according to a scroll speed which corresponds to the received user input, and scrolling the at least one object according to the scroll direction.

The display method may further include changing the number of objects and a size of the at least one object according to scroll speed which corresponds to the received user input.

The changing of the number of objects and the size of the at least one object may include increasing or reducing the number of objects in proportion to the scroll speed and increasing or reducing the size of the at least one object in inverse proportion to the scroll speed.

The number of objects and the size of the at least one object may be linearly changed.

The size of the area of the screen in which the at least one object is displayed, the number of objects, and the size of the at least one object may be changed to an initial state and then displayed with changes in response to a user input being completed.

The at least one object may be at least one selected from the group consisting of an application icon, a content icon, a thumbnail image, a folder icon, a widget, a list item, a menu, and a content image.

The user input may be a point input for the screen that is transmitted from the remote control apparatus, and the scroll speed may be calculated on the basis of a degree of change in a point of the point input on the screen for the unit of time.

The user input may be a point input for the screen transmitted from the remote control apparatus, and the scroll speed may be calculated on the basis of a degree of change in a point of the point input on the screen for a unit period of time.

The user input may be a control signal transmitted from the remote control apparatus, and the scroll speed may be set according to a type of the control signal.

The type of the control signal which corresponds to a button may be determined and transmitted to the display apparatus in response to the button provided in the remote control apparatus being manipulated.

The user input may be a control signal transmitted from a remote control apparatus, and the scroll speed may be set according to the number of times of the received control signal for a preset period of time.

The scroll speed may be in proportion to the number of times of the received control signal for the preset period of time.

The user input may be a control signal determined according to time when a specific button of a remote control is manipulated.

The scroll speed may increase according to the control signal, in response to a long press of a specific button of the remote control apparatus.

The display method may further include changing at least one of resolution and transparency of a content image displayed in the screen, according to the scroll speed in response to the at least one object being the content image.

According to another aspect of an exemplary embodiment, there is provided a display apparatus. The display apparatus may include: a display configured to display at least one object in a screen; an input configured to receive a user input which receives a scroll direction of the at least one object; and a controller configured to change a size of the one area of the screen in which the at least one object is displayed on the screen according to scroll speed which corresponds to the received user input, and scroll the at least one object according to the scroll direction.

The controller may change the number and a size of the at least one object according to scroll speed corresponding to the received user input.

The controller may increase or reduce the number of objects in proportion to the scroll speed and may increase or reduce the size of the at least one object in inverse proportion to the scroll speed.

The number of objects and the size of the at least one object may be linearly changed.

The controller may change and display the number of objects and the size of the at least one object to an initial state in response to the user input being completed.

The controller may be configured to control the width of the area of the screen in which the object is displayed, the number of objects, and the size of the at least one object to be changed and displayed to an initial state in response to the user input being completed.

The at least one object may be at least one object selected from the group consisting of an application icon, a content icon, a thumbnail image, a folder icon, a widget, a list item, a menu and a content image.

The user input may be a touch input performed on a touch screen of the display apparatus or a touch screen of a remote control apparatus to control the display apparatus, and the control speed may be calculated on the basis of a degree of change in a touch input point of the touch screen of the display apparatus or the touch screen of the remote control apparatus for a unit period of time.

The user input may be a point input for the screen transmitted from the remote control apparatus, and the scroll speed may be calculated on the basis of a degree of change in a point of the point input on the screen for the unit of time.

The user input may be a control signal transmitted from the remote control apparatus, and the scroll speed may be set according to a type of control signal.

The user input may be a control signal transmitted from a remote control apparatus, and the scroll speed may be set according to the number of times of the received control signal for the preset period of time.

The scroll speed is in proportion to the number of times of the received control signal for the preset period of time.

The user input may be a control signal determined according to time when a specific button of a remote control apparatus is manipulated, and the scroll speed may be set according to the control signal.

The scroll speed increases according to the control signal, in response to a long press of a specific button of the remote control apparatus.

The controller may change at least one of resolution and transparency of a content image displayed in the screen according to the scroll speed in response to the object being the content image.

The at least one object may be a sub image constituting one panorama image.

According to the above-described various exemplary embodiments, a more efficient method capable of intuitively displaying a large amount of objects is provided.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
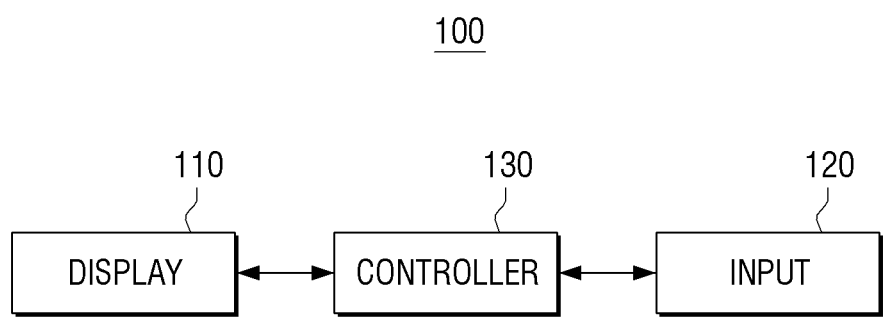
FIG. 1 is a block diagram which illustrates a configuration of a display apparatus, according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
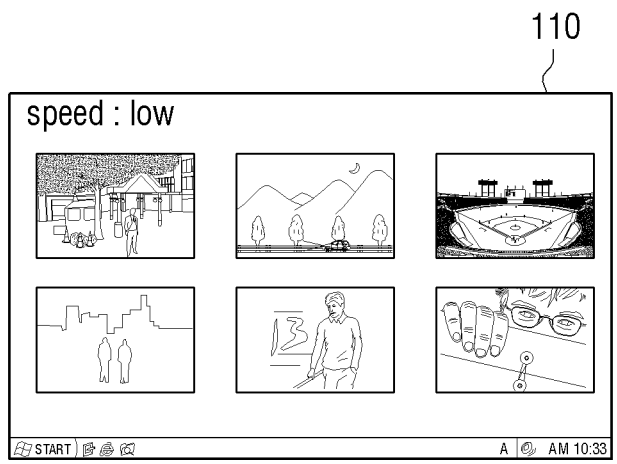
FIGS. 2 to 4 are schematic diagrams which illustrate display screens, according to an exemplary embodiment.
Figure 3:
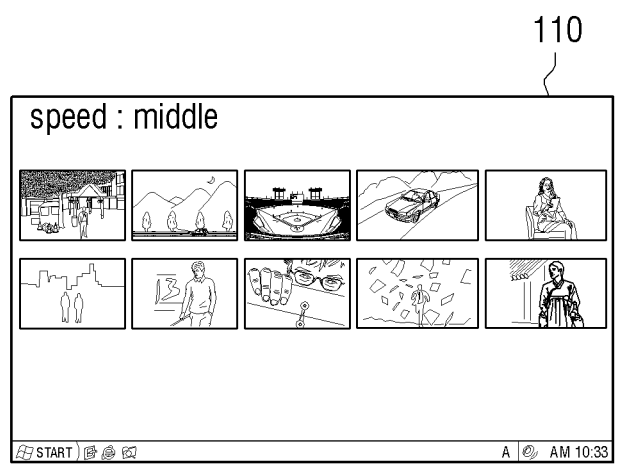
Figure 4:
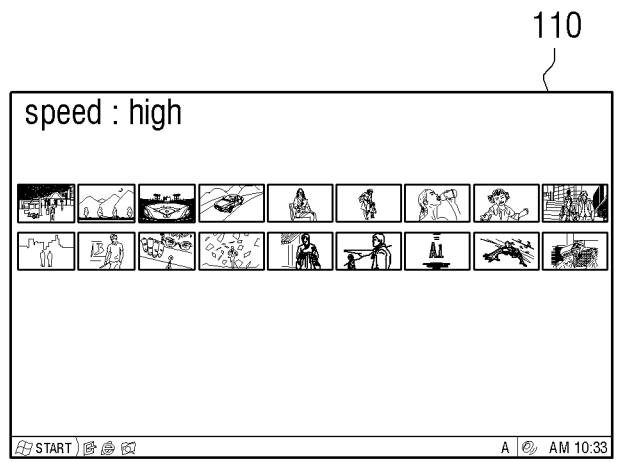

FIG. 1 is a block diagram illustrating a configuration of a display apparatus 100 according to an exemplary embodiment, and FIGS. 2 to 4 are schematic diagrams which illustrate display screens according to an exemplary embodiment.

Referring to FIG. 1, the display apparatus 100 according to an exemplary embodiment includes a display 110, a controller 130, and an input 120.

In the disclosure, the display apparatus 100 may include one or more displays, and may be an apparatus configured to execute an application or display contents. For example, the display apparatus may be implemented with at least one device selected from the group consisting of a digital television, a tablet, a personal computer (PC), a portable multimedia player (PMP), a personal digital assistant (PDA), a smart phone, a portable phone, a digital photo frame, a digital signage and a kiosk.

The display 110 is configured to display a screen including at least one object. The object denotes an image included in an image displayed on the screen, discriminable with the naked eye, and corresponding to a specific function or contents. The display 110 may display one image, and the one image may include at least one image.

The type of object is not limited. That is, the object may be at least one selected from the group consisting of an application icon, a content icon, a thumbnail image, a folder icon, a widget, a list item, a menu and a content image. The application icon is an icon which executes an application included in the display apparatus in response to a selection of an image corresponding thereto. The content icon is an icon which reproduces contents in response to an image corresponding thereto being selected. The thumbnail image is an image in which a size thereof is reduced and is displayed in order to be viewed at a glance. The folder icon is an icon which displays files in a folder in response to the selection of an image which corresponds thereto selected. The widget is an icon which provides a user interface to immediately execute the application icon without menu selection of several steps. The list item is configured to display a file in a list form, and the menu image is configured to display selectable menus.

The display 110 may be implemented in various display panels. That is, the display 110 may be implemented with an organic light emitting diode (OLED), a liquid crystal display (LCD) panel, a plasma display panel (PDP), a vacuum fluorescent display (VFD), a field emission display (FED) and an electro luminescence display (ELD), through various display techniques. The display panel may mostly include an emission type panel, but E ink, P-ink or photonic crystal may not be excluded. Further, the display panel may be implemented with a flexible display a transparent display, or the like. Further, the display apparatus 100 may be implemented with a multiple display apparatus 100 including two or more display panels.

The input 120 may be configured to receive a user input for scrolling a displayed screen. That is, the input 120 may allow other objects not displayed in the screen to be displayed through a scroll input in response to all objects not being displayed on the displayed screen.

The input 120 may be implemented with various interface techniques. For example, the input 120 may be implemented with a touch screen, a touch pad, a motion sensor module, a pointer, a mouse, a remote control controller using short-range communication technology, or the like.

The touch screen may include a touch panel configured to sense a user touch, and the touch panel may be configured to be attached to the above-described display 110 or to be included in a portion of the display 110. In response to the user touch existing in the touch panel, the touch sensor may sense the user touch, and may detect a location (a coordinate) and an intensity of the user touch. Further, the touch sensor may detect a type of the touch through duration of the touch, consecutive touch inputs, and the like. In an exemplary embodiment to be later described, in response to the user touch forming a trajectory and moves in a state in which the user touch is in contact with the touch panel, speed may be calculated using a moving time and a moving trajectory. The touch screen may be implemented with at least one of an electrostatic type and a piezoelectric type according to a user touch sensing method. The touch screen may be also implemented with other methods, for example, other techniques such as an image sensing method.

The touch pad may function in a similar fashion as the touch screen. However, unlike the touch screen, the touch screen is generally separated from the display 110, and constitutes a separate interface. Therefore, touch screen is attached to the display 110 so that the user may directly perform a touch in a location of an object displayed on the touch screen, while the touch pad performs a touch in a location which corresponds to a location of an object in the separate interface, and input the touch. The touch pad is a little less intuitive, but the touch pad is operated in a state in which the touch pad is separated from the display apparatus 100, and is portable.

The motion sensor module is configured to sense a motion of the user. In an exemplary embodiment, the motion sensor module may sense the motion through an image sensor. The image sensor captures an object, collects a two-dimensional image, detects an amount of change in the captured image, and recognizes an operation of the user. The user may control the device through the motion of a body part, such as a user's hand.

In another exemplary embodiment, as the motion sensor module, a speed sensor, an acceleration sensor, a gyro sensor, or the like, may be used. For example, in response to a remote control apparatus including the acceleration sensor, sensing information obtained through moving of the remote control apparatus by the user may be transmitted to the display apparatus 100, and a command for scrolling the screen of the display apparatus 100 may be transmitted.

In response to the input 120 being implemented with a remote controller (a remote control apparatus), the input 120 may generate a control signal, and may transmit the control signal to the display apparatus 100 in response to the user pressing a specific button of the remote controller.

The specific operation of components constituting the input 120 will be described in detail in an exemplary embodiment, which is to be described later.

The controller 130 controls an overall operation of the display apparatus 100. In particular, the controller 130 changes a size of at least one object and the number of objects displayed in the screen according to scroll speed which corresponds to the received user input, and scroll the screen according to a scroll direction.

Specifically, in response to the user input being received through the input 120, the controller 130 calculates the scroll speed according to the user input, and changes the number of objects and the size of the at least one object in the screen according to the scroll speed. In an exemplary embodiment, in response to the scroll speed being low according to the user input as illustrated in FIG. 2, the controller may relatively reduce the number of objects, and may relatively reduce the size of the at least one object. An exemplary embodiment in which six thumbnail images are displayed in the screen, is illustrated in FIG. 2B.

However, in response to the user performing an input which increases the scroll speed, the controller 130 may relatively increase the number of objects, and may relatively reduce the size of the object. It can be seen from the exemplary embodiment of FIG. 3 that the user performs an input for increasing the scroll speed, unlike the embodiment of FIG. 2, and at this time, ten thumbnail images are displayed, and the size of the at least one thumbnail image is further reduced. In response to the user further increasing the scroll speed, as illustrated in FIG. 4, it can be seen that eighteen thumbnail images are displayed, and the thumbnail images are displayed in a very small size.

Further, the controller 130 may increase the number of objects in the horizontal direction of the screen, and may maintain the number of objects as is in the vertical direction of the screen. That is, while the controller 130 maintains the number of objects in one direction of the screen, the controller 130 may increase or decrease the number of objects in other directions of the screen. In other words, while the controller 130 maintains the number of objects included in one row, the controller 130 may increase and decrease the number of rows in order to increase and decrease the number of objects. Alternatively, while the controller may maintain the number of objects included in one column, the controller 130 may increase and decrease the number of columns, in order to increase and decrease the number of objects.

The exemplary embodiments are advantageous in that the user recognizes the object. For example, in response to the number of objects being increased, the user has difficulty in finding a first location of the at least one object in response to the number of objects included in one row being increased and simultaneously the number of rows is increased. That is, the user has difficulty in recognizing the at least one object. Similarly, in response to the number of objects being increased, the user has difficulty in identifying a first displayed location of the at least one object in response to the number of objects included in one column being increased and the number of columns being simultaneously increased.

While the number of objects in one direction of the screen is maintained, the number of objects in other directions of the screen is increased or decreased, as illustrated in FIGS. 2 to 4. Therefore, more intuitive user experiences are provided to the user, and the objects of the exemplary embodiments are effectively obtained. That is, the user easily recognizes the at least one object since the user does not miss the at least one object which the user is watching, and the user are able to easily identify an object as a reference even in response to the user missing the at least one object.

In an exemplary embodiment, controller 130 may increase or decrease the number of objects in proportion to the scroll speed, or may increase or decrease the size of the object in inverse proportion to the scroll speed. That is, the number of objects is increased as the scroll speed is increased, whereas the number of objects is reduced as the scroll speed is reduced. In order, to display a smoother screen, the controller may be implemented to increase or decrease the number of objects substantially in direct proportion to the scroll speed. At this time, since the number of objects and the size of the at least one object are more sensitive to fine change in the scroll speed, a more intuitive user experience may be provided. However, the controller may be implemented to determine a range of the scroll speed and to change the number of objects and the size of the at least one object according the range of the scroll speed. At this time, the latter case is advantageous in terms of operational speed as compared with the former case. Further, the latter method is more realistic in a small-sized display having a scrolling function with a narrow moving range.

The scroll speed is calculated on the basis of an amount of change in a point moved on the screen of the display apparatus 100 for a unit period of time. The detection of the point moved on the screen may be changed according to a technology for implementing the input unit 120.

In response to the input 120 being implemented with a touch screen apparatus, the touch speed may be calculated on the basis of a distance between a first touch input point on the touch screen which is a touch start point and a second touch input point which is a touch stop point, and a difference between times when touches are sensed at the points. At this time, the first touch input point and the second touch input point are sequentially detected, a third touch input point is detected at a point adjacent to the first touch input point after the first touch, then a fourth touch input point adjacent to the third touch input point is immediately detected, and clearly there is no touch extinction section until the second touch input point is finally detected. Final scroll speed is calculated by adding or multiplying a weight to motion speed of the calculated touch trajectory. The object speed and the number of objects are determined according to the calculated scroll speed. The touch pad also operates according to a principle similar to the touch screen.

In response to the input 120 being implemented with a motion sensor module using an image sensor, the image sensor captures and detects a first input point which is an input start point, and captures and detects a second input point which is an input stop point. The image sensor is provided on a front side of the display apparatus 100, and captures a motion of the user. In response to the user inputting a capturing start input (through a button of a remote controller or an interface, or a motion) to the display apparatus 100, the image sensor captures a first input of the user. The image sensor identifies a location of the first input point in the captured image, and collects capturing time information. The image sensor captures the motion of the user at a predetermined time interval. Finally, the image sensor captures a second input, and identifies a location of a second input point and a capturing time. The motion speed is calculated on the basis of a distance between the first input point and the second input point and a difference between times when the inputs are sensed at the input points. At this time, a total distance may be calculated by detecting a third input point which is a middle point between the first input point and the second input point and adding a distance between the third input point and the first input point to a distance between the third input point and the second input point. At this time, the total moving distance can be more accurately calculated. Further, there is clearly no time when an input becomes extinct between the first input and the second input. Final scroll speed is calculated by adding or multiplying a weight to the calculated motion speed. Object speed and the number of objects which correspond to the calculated scroll speed are determined.

In response to the remote control apparatus including an acceleration sensor as the motion sensor module, the motion speed of the remote control apparatus is detected through a moving distance and time in response to the user moving the remote control apparatus from the input start point to the input stop point. The user presses a specific button of the remote control apparatus to instruct motion detection, and moves the remote control apparatus in a state in which the button is pressed. In response to the specific button of the remote control apparatus being pressed, the remote control apparatus generates a control signal notifying a scroll start, and transmits the control signal to the display apparatus 100 through a short-range communication device. In response to the user moving the remote control apparatus in a state in which the specific button is pressed, the acceleration sensor included in the remote control apparatus measures gravity acceleration every unit period of time. The gravity accelerations are recorded corresponds to location (height) information of the remote control apparatus. The gravity acceleration at the first input start point and the gravity acceleration in response to the user releasing the pressing of the specific button in order to instruct an input stop. Speed is calculated by dividing an amount of change in a location which corresponds to the gravity acceleration by a time difference between the input start and the input stop. In response to the user releasing a press of the specific button, the remote control apparatus generates an input stop signal, and the generated input stop signal is transferred to the display apparatus 100 through a short-range communication device. Final scroll speed is calculated by adding or multiplying a weight to the calculated motion speed. Object speed and the number of objects which correspond to the calculated scroll speed are determined.

The scroll speed of the remote control apparatus may be calculated in the remote control apparatus and may be transmitted to the display apparatus 100. The remote control apparatus may only transmit a time and gravity acceleration of a first input start point, and a time and gravity acceleration information of an input stop point to the display apparatus 100, and the controller 130 of the display apparatus 100 may calculate the scroll speed using the parameters.

A start point and a stop point of scroll of a remote control apparatus may be known, and information on scroll direction may also be known. The display apparatus 100 scrolls an object in a direction corresponding to a moving direction of a remote control apparatus.

A general control signal of the remote control apparatus may be used to calculate the scroll speed. The remote control apparatus may include buttons which correspond to different control commands, generate a control command through pressing of a corresponding button by a user, and may transmit the control command to the display apparatus 100. For example, in response to user pressing a first button, a control command for scrolling the screen in a first direction at a first speed is generated and transferred to the display apparatus 100 through a short-range communication device. The display apparatus 100 may adjust a size of an object to a preset size (to a large size), and may display the preset number of objects (a small number of objects) displayed in the screen while scrolling the screen to the first direction at the first speed (at a slow speed). In response to the user pressing a second button, a control command is issued for scrolling the screen in the first direction at a second speed and is transferred to the display apparatus 100 through a short-range communication device. The display apparatus 100 adjusts a size of an object to a preset size (to a small size), and displays the preset number of objects (a large number of objects) displayed in the screen, while scrolling the screen to the first direction at a second scroll speed (at a fast speed).

Further, scroll speed may be determined in accordance with speed or the number of times of a specific button of a remote control apparatus which is being manipulated sequentially. A user may perform manipulation such as sequentially pressing a specific button, and then, a corresponding control command is transmitted to the display apparatus 100 by using a short distance communication means. The display apparatus 100 sets scroll speed in accordance with speed or the number of times of sequentially manipulating the specific button.

When a remote control apparatus moves in a specific direction or a specific direction key of a remote control apparatus is manipulated, the display apparatus 100 scrolls at least one object in a direction corresponding to the moving direction or manipulated direction of the remote control apparatus, and changes the number and size of the object in accordance with the set scroll speed.

For the display apparatus to scroll an object in a moving direction of the remote control apparatus, the remote control apparatus has a motion sensor. The remote control apparatus or the display apparatus 100 calculates a moving direction of the remote control apparatus by using information obtained from the motion sensor.

According to an exemplary embodiment, when the specific button is pressed for a plurality of times rapidly and sequentially for a preset time, the display apparatus 100 may set a scroll speed to the first speed. In addition, when a remote control apparatus moves in one direction or any direction key of the remote control apparatus is manipulated, the display apparatus 100, while scrolling at least one object in a moving direction of the remote control apparatus, or a direction corresponding to the manipulated direction key, may increase the number of the objects displayed according to the first speed above or may decrease a size of each object.

When the specific button is pressed in a plurality of times more rapidly and sequentially than the above case for a preset time, the display apparatus 100 may set the scroll speed as the second speed which is faster than the first speed. In addition, when the remote control apparatus moves in any direction, or any direction key of the remote control apparatus is manipulated, the display apparatus 100, while scrolling at least one object in a moving direction of the remote control apparatus or a direction corresponding to a manipulated direction, may increase the number of objects displayed according to the preset second speed, or further decrease a size of each object.

However, when the specific button is pressed for a plurality of times less than the above exemplary embodiments for the preset time, the display apparatus 100 may set the scroll speed as the third speed which is slower than the first speed. Further, when the remote control apparatus moves in any direction, or any direction of the remote control apparatus is manipulated, the display apparatus 100, while scrolling at least one object in a moving direction of the remote control apparatus or a direction corresponding to the manipulated direction key, may decrease the number of the objects displayed according to the preset third speed, or may increase a size of each object. When the specific button is pressed only once for the preset time, the display apparatus 100 may set the scroll speed as a default speed which is slower than the third speed. Further, when the remote control apparatus moves in any direction, or any direction of the remote control apparatus is manipulated, the display apparatus 100, while scrolling at least one object in a moving direction of the remote control apparatus or a direction corresponding to the manipulated direction key, may decrease the number of the objects displayed according to the default speed, or may increase a size of each object.

Further, the scroll speed may be determined in accordance with the time when a specific button of the remote control apparatus is manipulated. A user may perform manipulation such as long press or short press, and then a corresponding control command is transmitted to the display apparatus 100 by using short distance communication means. The display apparatus 100 sets the scroll speed in accordance with the time when a specific button is manipulated.

When the remote control apparatus moves in a direction or any direction key on the remote control apparatus is manipulated, the display apparatus 100, while scrolling at least one object in a moving direction of the remote control apparatus or a direction corresponding to the manipulated direction key, changes the number and a size of object in accordance with the set scroll speed.

For the display apparatus to scroll an object in a moving direction of the remote control apparatus, the remote control apparatus has a motion sensor. The remote control apparatus or the display apparatus 100 calculates a moving direction of the remote control apparatus by using information obtained from the motion sensor.

In an exemplary embodiment, when the specific button is pressed for a preset time (normal press), the display apparatus 100 may set the scroll speed as the first speed. Further, when the remote control apparatus moves in any direction, or any direction key of the remote control apparatus is manipulated, the display apparatus 100, while scrolling at least one object in a moving direction of the remote control apparatus or a direction corresponding to the manipulated direction of the remote control apparatus, may increase the number of the objects displayed in accordance with the first scroll speed, or may decrease a size of each object.

When the specific button is pressed for a time longer than the preset time (long press), the display apparatus 100 may set the scroll speed as the second speed which is faster than the first speed. Further, when the remote control apparatus moves in any direction, or any direction key of the remote control apparatus is manipulated, the display apparatus 100, while scrolling at least one object in a moving direction of the remote control apparatus or a direction corresponding to the manipulated direction of the remote control apparatus, may increase the number of the objects displayed in accordance with the second scroll speed, or may further decrease a size of each object.

However, when the specific button is pressed for the time shorter than the time of the above exemplary embodiment (short press), the display apparatus 100 may set the scroll speed as the third speed which is slower than the first speed. Moreover, when the remote control apparatus moves in any direction, or any direction key of the remote control apparatus is manipulated, the display apparatus, while scrolling at least one object in a moving direction of the remote control apparatus or a direction corresponding to the manipulated direction of the remote control apparatus, may increase the number of the objects displayed in accordance with the third scroll speed, or may decrease a size of each object.

Further, the display apparatus 100 may include the above-described functions of the remote control apparatus. That is, the display apparatus 100 may be implemented to perform the above-described operations without the remote control apparatus. For example, the display apparatus 100 may include an acceleration sensor. At this time, in response to the display apparatus 100 moving fast in one direction, the display apparatus 100 may calculate speed in a manner similar to the above-described method, and the screen may scroll in the one direction. The display apparatus 100 may display the objects by increasing the number of objects and reducing a size of the object. On the other hand, in response to the display apparatus 100 moving slowly in the other direction, the display apparatus 100 may calculate speed in a manner similar to the above-described method, and may scroll the screen in the other direction. At this time, the display apparatus 100 may display the objects by reducing the number of objects and increasing the size of the object.

An interface, for example, with buttons may be provided in the display apparatus 100. The buttons may be displayed on a touch screen. In response to the user pressing a first button, a control command is issued for scrolling the screen in a first direction at a first speed generated, and the display apparatus 100 may adjust a size of an object to a preset size (to a large size), and displays the preset number of objects (a small number of objects) displayed in the screen while scrolling the screen to the first direction at a first speed (at a slow speed). In response to the user pressing a second button, a control command for scrolling the screen to the first direction at a second speed, and the display apparatus 100 adjusts a size of an object to a preset size (to a small size), and displays the preset number of objects (a large number of objects) displayed in the screen while scrolling the screen in the first direction at the second scroll speed (at a fast speed).

The above-described short-range communication technology is not limited to the specific technology set forth.

In an exemplary embodiment, the short-range communication method may comply with a WI-FI® communication standard. The display apparatus 100 may include a WI-FI® module.

The WI-FI® module performs short-range communication complying with the Institute of Electrical and Electronics Engineers (IEEE®) 802.11 technology standard. According to the IEEE® 802.11 technology standard, spread spectrum type wireless communication technology called, single carrier direct sequence spread spectrum (DSSS) and an orthogonal frequency division multiplexing (OFDM) type wireless communication technology called multicarrier OFDM, are used.

In another exemplary embodiment, the display apparatus 100 may be implemented with various mobile communication techniques. That is, the display apparatus may include a cellular communication module which enables data to be transmitted and received using existing wireless communication networks.

For example, third-generation (3G) mobile communication technology may be applied. That is, at least one technology from among wideband code division multiple access (WCDMA), high speed downlink packet access (HSDPA), and high speed uplink packet access (HSUPA), and high speed packet access (HSPA), may be applied.

In addition, fourth generation (4G) mobile communication technology may be applied. 2.3 GHz (portable Internet), mobile WiMAX, or WiBro are Internet techniques which are usable even when the display apparatus moves at high speed.

Further, 4G long term evolution (LTE®) technology may be applied. LTE® is extended technology of WCDMA and based on OFDMA and Multiple-Input Multiple-Output (MIMO) (multiple antennas) technology. The 4G LTE® uses the WCDMA technology and is an advantage of using existing networks.

As described above, WiMAX, WI-FI®, 3G, LTE®, and the like, which have wide bandwidth and high efficiency, may be used in the display apparatus 100, but application of other short-range communication techniques may be not excluded.

That is, the display apparatus 100 may include at least one among other short-range communication modules, such as a Bluetooth® module, an infrared data association (IrDa) module, a near field communication (NFC) module, a Zigbee® module, and a wireless local area network (LAN) module.

In addition to the above-described operations, the controller 130 controls the screen to be scrolled according to the scroll direction. That is, in response to the user performing scrolling on the screen to the left in the horizontal direction, scrolling to the left of the screen occurs. In the screen in which a plurality of thumbnail images are stored in one directory, in response to the display apparatus 100 receiving a user input to scroll to the left, other objects included in the directory other than objects displayed in the screen before the user input is received are scrolled to the left direction of the displayed screen. In response to the user performing scrolling to the right in the horizontal direction, objects displayed in the right of the screen sequentially disappeared from the screen, objects displayed in a central portion of the screen are displayed on the right side of the screen, and other objects included in the same directory are displayed to the left of the screen, in a predetermined order.

Further, as with an exemplary embodiment to be described later, the user may perform an input for scrolling in an upward or downward direction. In response to an input for scrolling in the upward or downward direction being received, the screen is scrolled in the upward or downward direction, and new objects are displayed.

In addition, the controller 130 may control an overall operation of the above-described display apparatus 100. The controller 130 may include a hardware configuration such as a central processing unit (CPU) or a cache memory, and a software configuration such as operating system, and/or applications for performing specific purposes. Control commands for the components are read to operate the display apparatus 100 according to a system clock, and electrical signals are generated according to the read control commands to operate the components of the hardware configurations.

Hereinafter, modified or added exemplary embodiments will be described.

Figure 5:
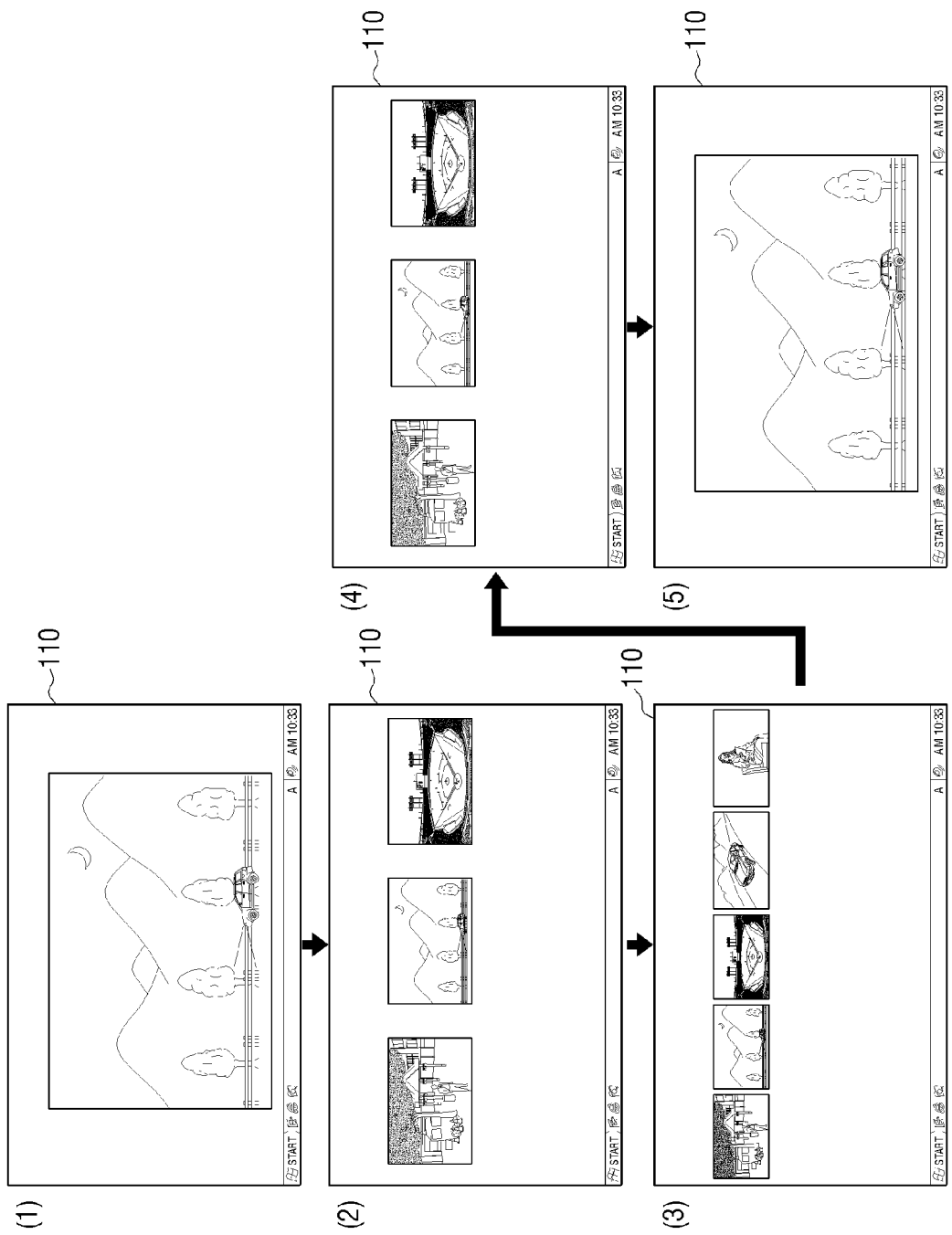
FIG. 5 is a schematic diagram which illustrates a display screen, according to another exemplary embodiment.

FIG. 5 is a schematic diagram illustrating a display screen according to another exemplary embodiment.

In the exemplary embodiment illustrated in FIG. 5, the controller 130 may change the number of objects and the size of the object to an initial state and may display a changed result in response to the user input being completed.

That is, in response to the scroll speed being increased while one image is displayed in FIG. 5(1), the controller 130 displays three images (FIG. 5(2)). In response to the scroll speed being further increased, the controller 130 displays five images (FIG. 5(3)). Then, in response to the scroll speed being reduced, the controller 130 displays three images again (FIG. 5(4)), and in response to the scrolling being stopped, the controller 130 displays one image as original (FIG. 5(5)). However, unlike FIG. 5, the one image returning back as an original image may be different from the image initially displayed. That is, only the number of the objects and size of the object finally played are equal to those of the object initially displayed, but an attribute of the finally displayed object is not necessarily equal to that of the initially displayed object.

In the exemplary embodiment, the display apparatus 100 may include a series of panorama image sets, each constituting of a plurality of images. While one piece of image may be included in the panorama image set in response to the scroll speed being slow, a plurality of consecutive images constituting the panorama image set may be displayed together, and sizes of the consecutive images may be reduced in response to the scroll speed being increased. In a state in which the scroll speed is reduced, in response to the number of consecutive images being reduced, and the scroll speed is converged to 0 (zero), the display apparatus only displays the one piece of image included in the panorama image again set. In the exemplary embodiment, the user may view the total panorama image set in one view through a fast scroll, and may view individual images constituting the panorama image set through a slow scroll.

Figure 6:
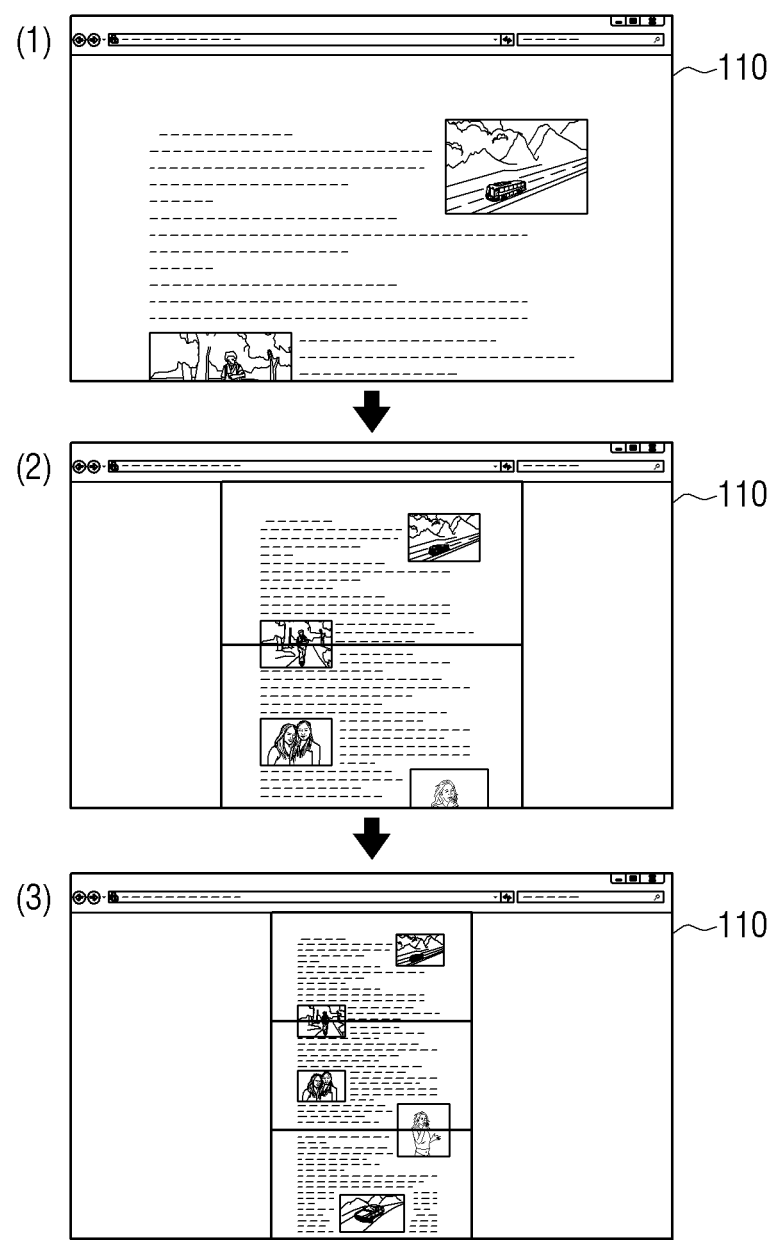
FIG. 6 is a schematic diagram which illustrates a screen of scrolling a web browser, according to another exemplary embodiment.

FIG. 6 is a schematic diagram which illustrates a screen of scrolling a web browser, according to another exemplary embodiment.

As described above, the scroll direction may be a vertical direction of a screen, a horizontal direction of the screen, and other preset directions. Next an object is displayed according to the scroll direction. FIG. 6 illustrates a web browser, and it can be seen that an input for scrolling to the horizontal direction is received, and as scroll speed is increased, a size of an object is reduced, and the number of objects is increased in the horizontal direction. Through the exemplary embodiment, the user may view in existing web browsers the entire web screen in one view without the use of a scroll bar.

The above-described various exemplary embodiments provide new user experiences for an interface of the display apparatus 100. In the exemplary embodiments, it is assumed that slow scroll of a displayed screen by the user allows the user to view objects of the displayed screen in detail for a relatively long period of time. On the other hand, it is assumed that a fast scroll of the screen by the user allows the user to totally scan the objects of the displayed screen. The exemplary embodiments provide a more efficient method of intuitively displaying a large amount of objects, as necessary and provides new user experiences.

The controller 130 may control at least one of resolution and transparency of a content image displayed in the screen to be changed in response to the object being the content image.

That is, the controller may display the content image through reduction in the resolution of the image for the object in response to the user scanning total objects, whereas the controller may display the content image through an increase in the resolution of the image for the object in response to the user watching the detailed object in detail.

The exemplary embodiment is useful in response to the display apparatus 100 being connected to an external apparatus, and information for the object being received from the exterior and then displayed. That is, in response to the number of objects displayed in one screen being increased, since an overhead of the display apparatus 100 is increased, the controller may efficiently drive the display apparatus 100 through reduction in the resolution of the objects. Similarly, the controller may drive the display apparatus in response to the display apparatus not being connected to the external apparatus, and the device stores the objects by itself.

Similarly, the controller may display the content image through increase in the transparency of the image for the object in response to the user scanning total objects, whereas the controller may display the content image through reduction in the transparency of the image for the object in response to the user watching the detailed object in detail.

Hereinafter, another configuration of the display apparatus according to the above-described embodiment will now be described. Specifically, the following configuration is to help with an understanding of the exemplary embodiments, and may not be an essential configuration, and an alternative configuration may exist.

Figure 7:
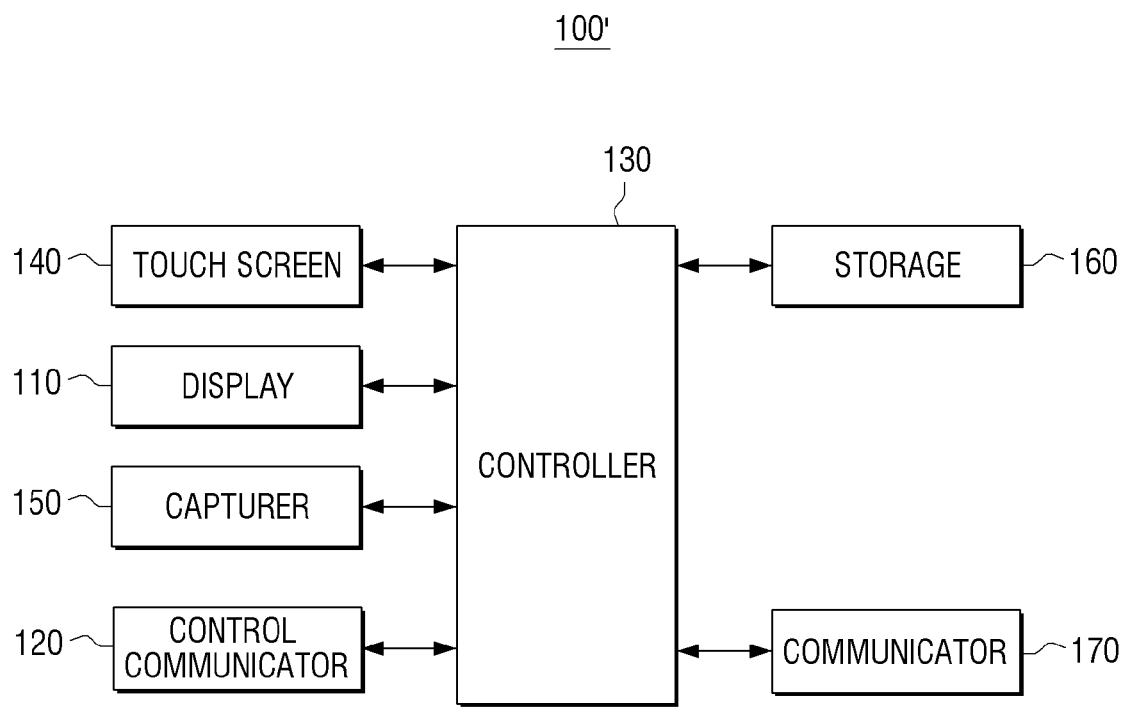
FIG. 7 is a block diagram which illustrates a configuration of a display apparatus, according to an exemplary embodiment.

FIG. 7 is a block diagram which illustrates a configuration of a display apparatus 100' according to another exemplary embodiment.

Referring to FIG. 7, the display apparatus 100' according to another exemplary embodiment includes a touch screen 140, a display 110, a capturer 150, a control communicator 120, a storage 160, and a communicator 170. Description of components of the display apparatus 100,' other than components to be described later, will be referred to as those of the display apparatus 100.

The display 110 includes a signal processor (not shown) and a display.

The signal processor forms an image frame. The signal processor includes at least one among an audio/video (A/V) decoder (not shown), a scaler (not shown), a frame rate converter (not shown), and a video enhancer (not shown). The A/V decoder separates and decodes audio data and video data, and the scaler adjusts an aspect ratio of an image in which an object is displayed. The video enhancer removes degradation or noise of an image, and transfers the image to the display according to a frequency set by the frame rate converter. The display may also include a timing controller, a gate driver, a data driver, a voltage driver (not shown) and a display panel. The display may include a back light as necessary. The components are not technical features of the exemplary embodiments, and thus detailed description thereof will be omitted.

The control communication module is configured to receive a control signal from the remote control apparatus. The above-described short-range communication techniques may be used, and the control communication module may include an infrared data association module.

The storage is configured to a program which executes the functions of the above-described controller 130 or stores various parameters, calculation values, and the like, for calculating the scroll speed. The storage may be implemented with a variety of recording media such as a compact disc (CD), a digital versatile disc (DVD), a hard disc, a Blu-ray Disc™, a memory card, and a universal serial bus (USB) memory.

The communicator may be configured to communicate with an external apparatus, and short-range or long-range wired/wireless communication techniques may be used. Further, the communicator may be connected to various apparatus or to a server through the Internet.

Hereinafter, a display method of a display apparatus according to various exemplary embodiments will be described.

Figure 8:
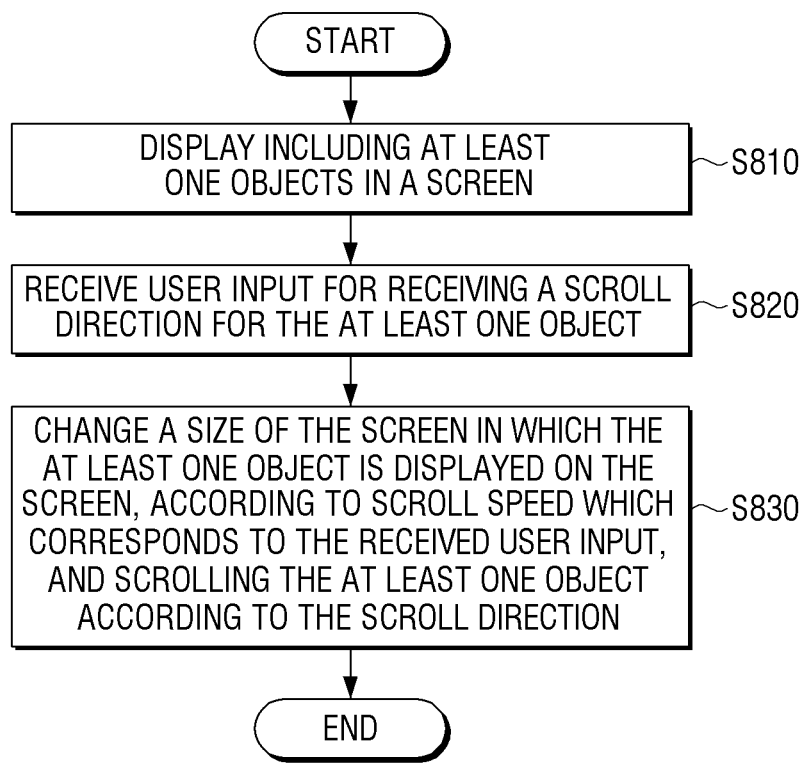
FIG. 8 is a flowchart which illustrates a display method of a display apparatus, according to various exemplary embodiments.

FIG. 8 is a flowchart which illustrates a display method of a display apparatus, according to various exemplary embodiments.

Referring to FIG. 8, a method for displaying a display apparatus according to various exemplary embodiments include displaying at least one object on a screen (S810), receiving a user input for receiving a scroll direction for the at least one object (S820), changing a size of the area of the screen in which the at least one object is displayed on the screen, according to scroll speed which corresponds to the received user input, and scrolling the at least one object according to the scroll direction (S830).

The method for displaying may further include changing the number and a size of the at least one object according to scroll speed which corresponds to the received user input.

At this time, the user input may be a touch input performed on a touch screen of the display apparatus or a touch screen of the remote control apparatus which is configured to control the display apparatus, and the scroll speed may be calculated on the basis of a degree of change in a touch input point on the touch screen of the display apparatus or the touch screen of the remote control apparatus for a unit period of time.

The changing of the number of objects and the size of the at least one object may include increasing or reducing the number of objects in proportion to the scroll speed and increasing or reducing the size of the at least one object in inverse proportion to the scroll speed.

The number of objects and the size of the at least one object may be linearly changed.

The number of objects, and the size of the at least one object may be changed to an initial state and then displayed in response to the user input being completed.

At this time, the width of the area of the screen in which the object is displayed, the number of objects, and the size of the at least one object may be changed to the initial state and then displayed in response to the user input being completed.

Further, the scroll direction may be a vertical direction or a horizontal direction of the screen.

The at least one object may be at least one selected from the group consisting of an application icon, a content icon, a thumbnail image, a folder icon, a widget, a list item, a menu and a content image.

The user input may be a point input for the screen transmitted from the remote control apparatus, and the scroll speed may be calculated on the basis of a degree of change in a point of the point input on the screen for the unit period of time.

The user input may be a control signal transmitted from the remote control apparatus, and the scroll speed may be set according to a type of control signal.

The type of control signal which corresponds to a button may be determined and transmitted to the display apparatus in response to the button provided in the remote control apparatus being manipulated.

Further, the user input may be a control signal transmitted from the remote control apparatus, and the scroll speed may be set according to the number of times of the received control signal for a preset time.

In addition, the scroll speed may be in proportion to the number of times of the received control signal for the preset period of time.

Further, the user input may be a control signal determined according to time when a specific button of a remote control apparatus is manipulated, and the scroll speed may be set according to the control signal.

Moreover, in response to a long press of a specific button of the remote control apparatus, the scroll speed may increase according to the control signal.

The display method may further include changing at least one of resolution and transparency of a content image displayed in the screen according to the scroll speed in response to the at least one object being the content image.

The above-described display method of a display apparatus may be implemented with a program including an algorithm executable on a computer, the program may be recorded in a non-transitory computer-recordable storage medium.

The non-transitory computer-recordable storage medium is not a medium configured to temporarily store data such as a register, a cache, a memory, and the like but an apparatus-readable medium configured to semi-permanently store data. Specifically, the above-described applications or programs may be stored and provided in the non-transitory computer-recordable medium such as a CD, a DVD, a hard disc, a Blu-ray Disc™, a universal serial bus (USB), a memory card, a read only memory (ROM), and the like The foregoing exemplary embodiments and advantages are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed:
1. A display method of a display apparatus, the method comprising:
    displaying at least one object in an area of a screen;
    changing a size of the area of the screen in which the at least one object is displayed and the number of objects displayed in the area, according to scroll speed of a user input for the at least one object, and scrolling the at least one object according to a scroll direction of the user input; and
    increasing or decreasing transparency of the at least one object in proportion to the scroll speed,
    wherein the changing the size of the area of the screen includes moving both edges, which define a width of the area, to increase or decrease the width of the area, according to the scroll speed of the user input,
    wherein the at least one object is at least one sub image included in a panoramic image, and
    wherein a number and a size of the at least one sub image displayed on the screen, among a plurality of sub images included in the panoramic image, are changed according to the scroll speed.

2. The method as claimed in claim 1, further comprising:
changing a size of the at least one object according to the scroll speed which corresponds to the received user input.

3. The method as claimed in claim 2, wherein the changing of the number of objects and the size of the at least one object includes increasing or decreasing the number of objects in proportion to the scroll speed and increasing or decreasing the size of the at least one object in inverse proportion to the scroll speed.

4. The method as claimed in claim 2, wherein the number of objects and the size of the at least one object are linearly changed.

5. The method as claimed in claim 2, wherein the size of the area of the screen in which the at least one object is displayed, the number of objects, and the size of the at least one object are changed to an initial state and then displayed in response to user input being completed.

6. The method as claimed in claim 1, wherein the at least one object is at least one selected from the group consisting of an application icon, a content icon, a thumbnail image, a folder icon, a widget, a list item, a menu and a content image.

7. The method as claimed in claim 1, wherein the user input is a touch input performed on a touch screen of the display or a touch screen of a remote control apparatus to control the display apparatus, and
wherein the scroll speed is calculated on the basis of a degree of change in a touch input point on the touch screen of the display apparatus or the touch screen of the remote control apparatus for a unit period of time.

8. The method as claimed in claim 1, wherein the user input is a point input for the screen transmitted from a remote control apparatus, and
wherein the scroll speed is calculated on the basis of a degree of change in a point of the point input on the screen for a unit period of time.

9. The method as claimed in claim 1, wherein the user input is a control signal transmitted from a remote control apparatus, and
wherein the scroll speed is set according to a type of control signal.

10. The method as claimed in claim 9, wherein the type of control signal which corresponds to a button is determined and transmitted to the display apparatus in response to the button provided in the remote control apparatus being manipulated.

11. The method as claimed in claim 1, wherein the user input is a control signal transmitted from a remote control apparatus, and
wherein the scroll speed is set according to the number of times of the received control signal for a preset period of time.

12. The method as claimed in claim 11, wherein the scroll speed is in proportion to the number of times of the received control signal for the preset period of time.

13. The method as claimed in claim 1, wherein the user input is a control signal determined according to time when a specific button of a remote control apparatus is manipulated.

14. The method as claimed in claim 13, wherein scroll speed increases according to the control signal, in response to a long press of a specific button of the remote control apparatus.

15. The method as claimed in claim 1, further comprising changing resolution of the at least one object according to the scroll speed.

16. A display apparatus comprising:
a display configured to display at least one object in an area of a screen;
an input configured to receive a user input; and
a controller configured to:
change a size of the area of the screen in which the at least one object is displayed and the number of objects displayed in the area, according to scroll speed of the user input for the at least one object, scroll the at least one object according to a scroll direction of the user input, and
increase or decrease transparency of the at least one object in proportion to the scroll speed,
wherein the controller moves both edges, which define a width of the area, to increase or decrease the width of the area, according to the scroll speed of the user input,
wherein the at least one object is at least one sub image included in a panoramic image, and
wherein a number and a size of the at least one sub image displayed on the screen, among a plurality of sub images included in the panoramic image, are changed according to the scroll speed.

17. The display apparatus as claimed in claim 16,
wherein the controller changes a size of the at least one object according to the scroll speed corresponding to the received user input.

18. The display apparatus as claimed in claim 17, wherein the controller is configured to increase or decrease the number of objects in proportion to the scroll speed and increases or decreases the size of the at least one object in inverse proportion to the scroll speed.

19. The display apparatus as claimed in claim 17, wherein the number of objects and the size of the at least one object are linearly changed.

20. The display apparatus as claimed in claim 17, wherein the controller is configured to control the width of the area of the screen in which the at least one object is displayed, the number of objects, and the size of the at least one object to be changed and displayed to an initial state in response to the user input being completed.

21. The display apparatus as claimed in claim 16, wherein the at least one object is at least one object selected from the group consisting of an application icon, a content icon, a thumbnail image, a folder icon, a widget, a list item, a menu and a content image.

22. The display apparatus as claimed in claim 16, wherein the user input is configured to be a touch input performed on a touch screen of the display apparatus or a touch screen of a remote control apparatus configured to control the display apparatus, and
wherein the scroll speed is calculated on the basis of a degree of change in a touch input point of the touch screen of the display apparatus or the touch screen of the remote control apparatus for a unit period of time.

23. The display apparatus as claimed in claim 16, wherein the user input is a point input for the screen transmitted from a remote control apparatus, and
wherein the scroll speed is calculated on the basis of a degree of change in a point of the point input on the screen for a unit period of time.

24. The display apparatus as claimed in claim 16, wherein the user input is a control signal transmitted from a remote control apparatus, and
wherein the scroll speed is set according to a type of control signal.

25. The display apparatus as claimed in claim 16, wherein the user input is a control signal transmitted from a remote control apparatus,
   wherein the scroll speed is set according to the number of times of the received control signal for the preset period of time.

26. The display apparatus as claimed in claim 25, wherein the scroll speed is in proportion to the number of times of the received control signal for the preset period of time.

27. The display apparatus as claimed in claim 16, wherein the user input is a control signal determined according to time when a specific button of a remote control apparatus is manipulated,
   wherein the scroll speed is set according to the control signal.

28. The display apparatus as claimed in claim 27, wherein scroll speed increases according to the control signal, in response to a long press of a specific button of the remote control apparatus.

29. The display apparatus as claimed in claim 16, wherein the controller changes resolution of the at least one object according to the scroll speed.

\* \* \* \* \*